May 1, 1934.    J. W. ARMOUR    1,957,309

DISTRIBUTOR FOR DUST LADEN GASES

Filed Feb. 6, 1933

INVENTOR
JAMES W. ARMOUR
BY
Albert G. Blodgett
ATTORNEY

Patented May 1, 1934

1,957,309

UNITED STATES PATENT OFFICE 1,957,309

DISTRIBUTOR FOR DUST-LADEN GASES

James W. Armour, Worcester, Mass., assignor to Riley Stoker Corporation, Worcester, Mass., a corporation of Massachusetts Application February 6, 1933, Serial No. 655,362

3 Claims. (Cl. 302—28)

This invention relates to distributors for dust-laden gases, and more particularly to a construction which will serve to distribute a stream of dust-laden gas from a single main conduit among a plurality of branch conduits.

The invention is particularly adapted for use in connection with pulverized fuel burning systems, in which it is often desirable to divide a main stream of pulverized fuel and primary air into several smaller streams each of which is delivered to a separate furnace burner. It has heretofore been proposed to provide a main conduit, a pair of branch conduits leading therefrom to the burners, and an adjustable vane located at the junction of the branch conduits to control the distribution of the fuel and air stream. It is usually found however that when the vane in such a construction is adjusted to give substantially uniform distribution of the fuel among the branch conduits, the air will be very unevenly distributed. It frequently happens that one of the branch conduits will have so little air supplied thereto that the fuel will drop out of suspension and clog the passage. In any event the uneven distribution of the air causes great difficulty in the operation of the furnace burners. Similar problems are encountered in various other arts in which fine particles of solid material are carried in suspension in a gaseous stream.

It is accordingly one object of the invention to provide a simple and inexpensive construction which will serve to divide a stream of dust-laden gas into a plurality of smaller streams, all of which will contain substantially the same proportions of dust and gas.

It is a further object of the invention to provide a distributor which will serve to divide a stream of dust-laden gas into a plurality of smaller streams, all of which will contain the same quantity of dust and the same quantity of gas.

It is a further object of the invention to provide a distributor which can be adjusted to vary the distribution of the dust without materially affecting the distribution of the gas in which the dust is carried.

With these and other objects in view, as will be apparent to those skilled in the art, the invention resides in the combination of parts set forth in the specification and covered by the claims appended hereto.

In accordance with my invention I provide a main conduit to which dust-laden gas is supplied, and a plurality of branch conduits leading therefrom. One or more adjustable vanes are provided to control the distribution of the dust among the branch conduits, and these vanes are located at one side of the gas stream and they extend only part way into the gas stream. The dust is caused to segregate toward the side at which the vanes are located, so that adjustment of the vanes will effect the distribution of the dust to a much greater extent than the distribution of the gas. This segregation is preferably brought about by centrifugal force, either by providing a bend in the main conduit, or by utilizing a rotary fan. A deflector is preferably mounted transversely of the stream anterior to the vanes and arranged to force the dust against the side of the conduit and cause it to spread out in a substantially uniform layer just before it reaches the vanes.

Referring to the drawing illustrating one embodiment of the invention, and in which like reference numerals indicate like parts, Fig. 1 is an elevation of a distributor;

Figure 1:
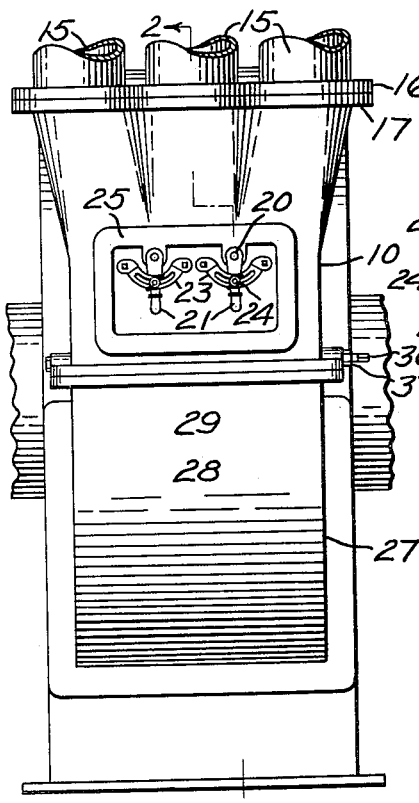

The embodiment illustrated comprises a hollow casing 10 shaped to provide a main conduit 11 which is preferably vertical and substantially rectangular in cross-section. Two transverse partitions 12 divide the upper portion of the casing into three branch conduits 14 which lead upwardly from the main conduit. These branch conduits are located in the same plane. Pipes 15 communicate with the branch conduits, and if pulverized fuel is to be distributed these pipes will lead to separate furnace burners (not shown). The inlet ends of the pipes 15 are shown screw-threaded into a horizontal plate 16 which is fastened to a flange 17 at the upper end of the casing 10.

Two adjustable vanes 19 are provided to control the distribution of the stream among the branch conduits. Each vane is pivotally mounted at the lower end of one of the partitions 12, between a pair of adjacent branch conduits. In the preferred construction the upper edge of each vane is attached to a horizontal pivotally supported shaft 20 located close to the adjacent partition wall 12 and provided with a handle 21. Each handle 21 swings close to a stationary arcuate plate 23, and a wing nut 24 is provided to clamp these parts together and hold the vane in a desired position of adjustment. The vanes 19 and the operating mechanism therefor are preferably mounted on a cover plate 25 which is fastened to the casing 10 and forms a portion of one wall of the main conduit 11. This wall is substantially straight in transverse cross-section. It will be noted that the vanes 19 extend only part way across the main conduit, and in fact less than one-third of the distance across.

Figure 2:
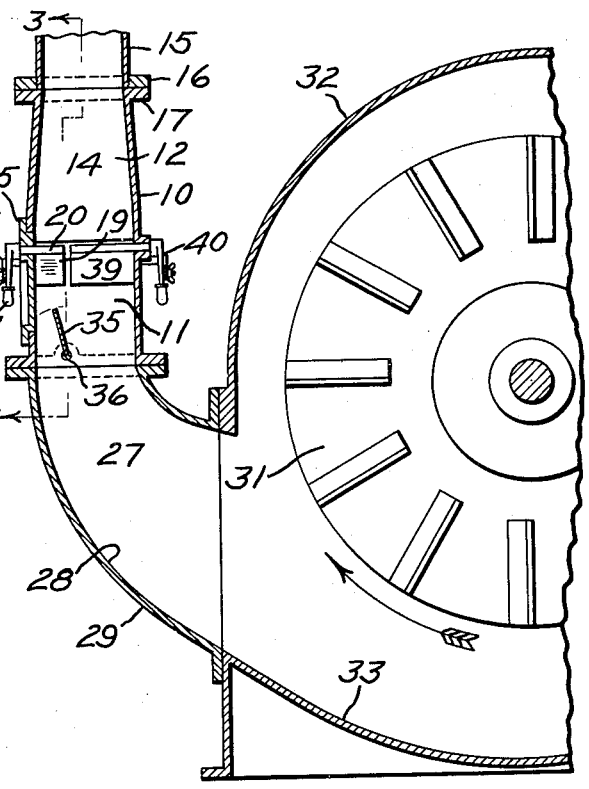
Fig. 2 is a section on the line 2—2 of Fig. 1.
Figure 3:
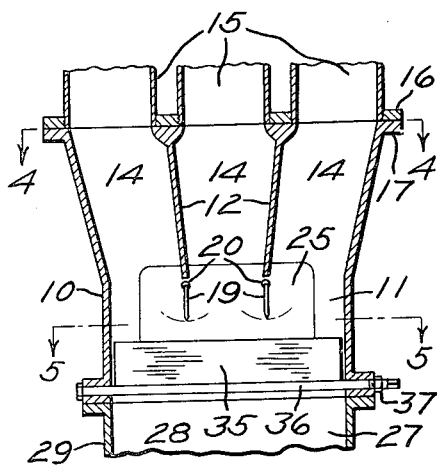
Fig. 3 is a section on the line 3—3 of Fig. 2.
Figure 4:
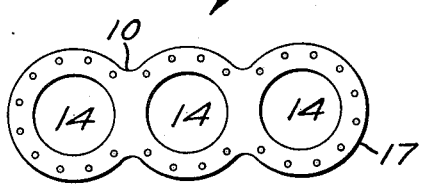
Fig. 4 is a view taken on the line 4—4 of Fig. 3.
Figure 5:
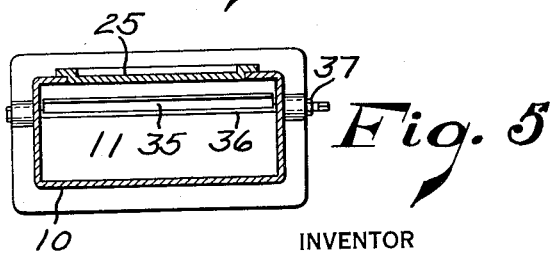
Fig. 5 is a section on the line 5—5 of Fig. 3.

The mixture of gas and dust which is to be distributed is delivered to the main conduit, and means is provided which causes the dust to segregate toward the side at which the vanes 19 are located. For this purpose I have shown a bend or curve 27 in the main conduit anterior to the vanes in a plane perpendicular to the plane of the branch conduits, this bend being so arranged that the dust will segregate against the outer wall 28 thereof under the influence of centrifugal force and then flow close to the vanes. The bend 27 is shown formed in a separate member 29 which is fastened to the lower end of the casing 10. As a further means for causing the desired dust segregation, I have shown a rotary fan 31 mounted in a housing 32 and arranged to deliver the dust and gas stream directly to the bend 27, the member 29 being mounted on the fan housing. The fan 31 is rotated in the direction of the arrow in Fig. 2, and produces a decided segregation of the dust adjacent to the peripheral wall 33 of the fan housing. The outer wall 28 of the bend 27 provides a smooth continuation of this wall 33, so that the segregation is not disturbed. The fan 31 may form a part of a complete pulverizing apparatus of the type shown in the patent to Craig No. 1,739,213 dated December 10, 1929.

In some cases it is desirable to provide a deflector which will force the dust against the side of the conduit and cause it to spread out in a substantially uniform layer anterior to the vanes 19. For this purpose I have shown a deflector 35 extending transversely of the main conduit 11 just below the vanes 19. This deflector is preferably angularly adjustable, and is therefore mounted on a horizontal shaft 36 extending at right angles to the shafts 20 and rotatably supported in the casing 10. A nut 37 serves to clamp the shaft 36 in a desired position of adjustment.

The operation of the invention will now be apparent from the above disclosure. A mixture of dust and gas, such as pulverized fuel and air, is supplied to the fan 31, which whirls the mixture and delivers it to the main conduit 11. The rotary motion of the fan causes the dust to segregate against the wall 33, because of centrifugal force, and this segregation is maintained and increased as the stream flows through the bend 27. The deflector 35 serves to spread the dust out into a substantially uniform layer transversely of the conduit. The vanes 19 split the segregated portion of the stream into three parts, each of which enters one of the branch conduits 14 and the corresponding delivery pipe 15. By adjusting the vanes 19, it is possible to deliver the dust in the desired relative proportions among the respective branch conduits. Because of the segregation, most of the dust will flow adjacent to these vanes. Since the vanes extend only part way into the conduit, they may be adjusted without effecting to any appreciable degree the distribution of the gas among the branch conduits. Hence there will always be a sufficient quantity of gas flowing in each conduit to maintain the necessary velocity and prevent settling and lodging of the dust. In the usual case, it is desired to divide the gas and dust equally among the branch conduits, and this may be substantially accomplished by means of my invention, provided the branch conduits all afford substantially the same resistance to the flow. The construction is simple and inexpensive, and there is nothing to cause trouble in operation.

In case it is desired to control the distribution of both the dust and gas, and particularly when the branch pipes 15 differ considerably in length and thus offer widely differing resistances to the gas flow, I may utilize vanes 39 (Fig. 2) which are pivotally mounted on the wall of the casing 10 directly opposite to the vanes 19. These vanes 39 preferably extend nearly to the vanes 19, and they may be adjusted and clamped by means of a mechanism 40 similar to that employed for the vanes 19. It will be apparent that the vanes 39 may be adjusted to vary the distribution of the gas among the branch conduits without materially affecting the distribution of the dust. By properly adjusting both sets of vanes it is possible to supply the branch conduits with equal quantities of dust and equal quantities of gas irrespective of the relative resistances of the pipes 15.

Having thus described my invention, what I claim as new and desire to secure by Letters Patent is:

1. A distributor for dust laden gas comprising a main conduit, a plurality of branch conduits leading therefrom and all located in substantially the same plane, one wall of the main conduit being substantially straight in transverse cross-section, a pivotally mounted vane between each pair of adjacent branch conduits to control the distribution of the dust thereto, the vanes being located adjacent to the straight wall of the conduit and extending only part way into the gas stream, means to segregate the dust toward the said straight wall, and a deflector mounted transversely of the main conduit to force the dust against the straight wall and cause it to spread out in a substantially uniform layer just before it reaches the vanes.

2. A distributor for dust laden gas comprising a main conduit, two branch conduits leading therefrom, a pivotally mounted vane located at one side of the main conduit to control the distribution of the dust between the branch conduits, the vane extending only part way into the gas stream, means to segregate the dust toward the side of the main conduit at which the vane is located, and a pivotally mounted vane located at the other side of the main conduit to control the distribution of the gas between the branch conduits.

3. A distributor for dust laden gas comprising a fan housing, a rotatable fan within the fan housing, a main discharge conduit connected tangentially to the fan housing and having one wall which is substantially straight in transverse cross-section, said straight wall forming a smooth continuation of the peripheral wall of the fan housing, two branch conduits leading from the main conduit, and a manually adjustable vane between the branch conduits to control the distribution of the dust thereto, the vane being located adjacent to the straight wall of the main conduit and extending only part way into the gas stream, the parts being so constructed and arranged that the fan will cause the dust to segregate toward the peripheral wall of the fan housing and this segregation will continue as the stream flows into the main conduit.

JAMES W. ARMOUR.